Figure 1:
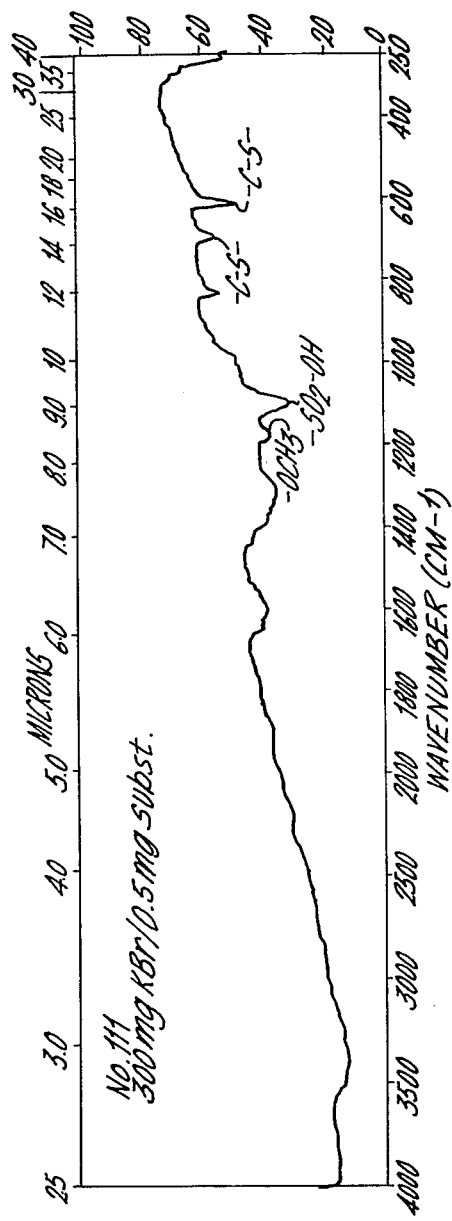
Figure 2:
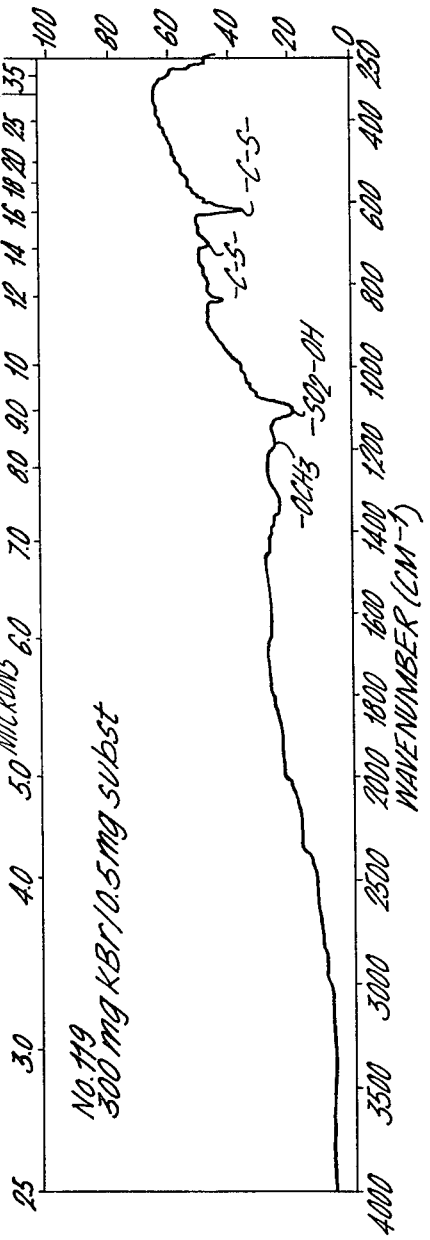

United States Patent [19]

Lindberg et al.

[11] 4,107,111

[45] Aug. 15, 1978

[54] POLYMER MADE OF LIGNIN, AND METHOD FOR MAKING IT

[75] Inventors: Jarl Johan Lindberg, Helsinki; Johannes Turunen, Rauma; Bo Hortling, Helsinki, all of Finland

[73] Assignee: Rauma-Repola Oy, Rauma, Finland

[21] Appl. No.: 551,688

[22] Filed: Feb. 21, 1975

[30] Foreign Application Priority Data

Feb. 21, 1974 [FI] Finland .................................. 518/74
Aug. 21, 1974 [FI] Finland ............................ 750282/74

[51] Int. Cl.$^2$ ......................... C07G 1/00; C08H 5/02; C08L 97/00
[52] U.S. Cl. .............................. 260/17.5; 106/163 R; 260/124 R
[58] Field of Search ................. 260/17.5, 124, 124 A, 260/79; 106/163

[56] References Cited

U.S. PATENT DOCUMENTS

| | | | |
|---|---|---|---|
| 2,379,889 | 7/1945 | Dorland et al. | 260/124 |
| 2,453,213 | 11/1948 | Farber | 260/124 R |
| 2,692,206 | 10/1954 | Othmer et al. | 106/163 R |
| 2,698,307 | 12/1954 | Heritage | 106/163 |
| 2,711,430 | 6/1955 | Hagglund et al. | 260/609 R |
| 2,864,715 | 12/1958 | Glab | 106/163 |
| 2,872,330 | 2/1959 | Glab | 106/163 |
| 2,976,164 | 3/1961 | Glab | 106/163 |
| 2,984,580 | 5/1961 | Glab | 106/163 |
| 3,148,177 | 9/1964 | Wiley et al. | 260/17.5 |
| 3,208,864 | 9/1965 | Glab | 106/163 |
| 3,252,815 | 5/1966 | Glab | 106/163 |
| 3,355,400 | 11/1967 | Smith et al. | 260/17.5 |
| 3,490,991 | 1/1970 | Fisher et al. | 260/124 A |

FOREIGN PATENT DOCUMENTS

331,416 12/1970 Sweden.
361,310 10/1973 Sweden.
199,383 9/1967 U.S.S.R.

OTHER PUBLICATIONS

Chemical Abstracts, vol. 56, No. 3701h, 1962.
Chemical Abstracts, vol. 74, No. 127,842, 1971.

*Primary Examiner*—Allan Lieberman
*Attorney, Agent, or Firm*—Burns, Doane, Swecker & Mathis

[57] ABSTRACT

This invention relates to a three-dimensional, aromatic, sulfur-containing polymer based on lignin. The polymer is characterized in that it is amorphous, practically insoluble in water and conventional organic solvents; it contains thioether bonds and possibly sulfoxide and/or sulfone groups formed by oxidizing of thioether bonds, and possibly carbon-carbon bonds between aromatic rings and/or side chains and possibly other bonds typical to lignin, depending on reaction conditions. Its thermostability is at least 200° C.; and it has been obtained from lignin which is dissolved or undissolved, chlorinated or unchlorinated, purified or containing other components of spent pulp liquor, by heating at about 160°–350° C., preferably in an atmosphere substantially of nitrogen and/or water vapor, for a time sufficient to form the polymer, with sulfur and/or inorganic or organic sulfur compounds so that degradation products of lignin, containing aromatic rings, or corresponding aromatic compounds, with an activating substituent have possibly been added.

23 Claims, 5 Drawing Figures

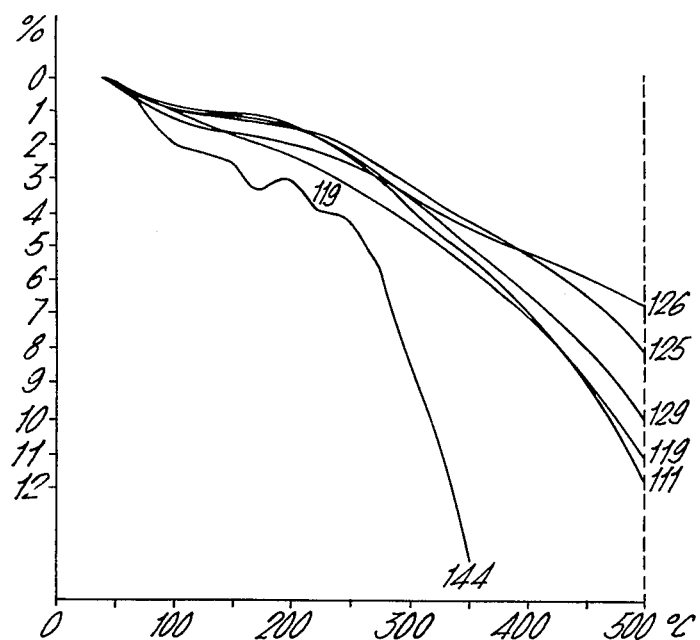

POLYMER MADE OF LIGNIN, AND METHOD FOR MAKING IT

This invention relates to a three-dimensional, aromatic, sulfur containing polymer of great molecular size and based on lignin, and to a method for making this polymer.

The object of the invention is to refine lignin into various thermostabile aromatic sulfur containing polymers. These have great chemical and mechanical stability and good electrical insulating power.

In the following the term "lignin" means the polymeric, aromatic component of plants. Different plants have varying amounts of it, and it has different structures in different plant species. In the production of pulp, for instance, lignin is removed to a greater or lesser extent, by dissolving, and various changes then take place in the lignin structure as well as in its element composition and polymerization grade. Dissolved lignin can be recovered either separately or together with dissolved carbohydrates and other dissolved components of wood. All kinds of lignin can be used in the method of this invention, irrespective of the pulp production method. Lignin remaining from wood saccharifying or corresponding processes can also be used. Also lignin from various stages of pulp bleaching, mainly from the chlorinating stage, thioglycol acid lignin or corresponding sulfur containing lignin can be used.

In the following the term "thermostable polymers" is used as meaning products having a weight loss of less than 10% over a period of one-half hour when heated to 200° C in an inert gas, measured by a thermogravimetric analyser or TGA apparatus.

Some known methods of utilizing lignin are described below. A reference number in brackets has been used in connection with this description, and the reference number corresponds to a publication or patent in the list at the end of this specification. The data in the publication list has been set forth in the following order: the author, the name of the publication or periodical, year, issue, the place of publication, and the pages. The owner, country, patent number, and class have been given in connection with cited patents. So far lignin has been used in industrial scale mainly according to the following methods:

1. The most common method is to burn the spent liquor so that the released heat is utilized and inorganic chemicals are regenerated (1,2).

2. The most important products of small molecular size and made of lignin are vanillin, which is made by an oxidizing reaction, and dimethyl sulfide, which is formed in the substitution reaction of sulfide ions with the methoxy groups of lignin. Vanillin can be further oxidized into vanillin acid, the derivatives of which have been used as medicines. By oxidizing dimethyl sulfide, dimethyl sulfoxide, which is an important solvent, is obtained (1,2).

3. Solutions of salts of lignin preparations of great molecular size are mainly used for purposes where the object is to change the surface active properties or viscosity, for instance as auxiliary agents in oil drilling or as additives of cement (2,3).

4. Carbon for making carbon disulfide, and active carbon for various purifying and recovery purposes have been made from lignin. Also methods of manufacturing of textile and carbon fibers have been patented (2–7).

5. Due to the reaction capacity of the functional groups of lignin preparations, lignin can be used in various polymers, tanning agents, plastics or resins, and adhesives, instead of phenols (2).

It is also known that desulfonated lignin products are formed in production of vanillin as the yield of vanillin is only about 4 to 10% of amount of the lignosulfonic acid. The products thus obtained can be used as additives in resins, for instance, but they are not particularly heat resistant (2).

When spent liquor from sulfite cooking is heated with acids, hexose sugars are converted into levulinic acids, and pentosanes into furfurals and its derivates, which then are condensed with lignosulfonates into products insoluble in water, which Penobscot Chemical Fibre Company, for instance, has sold as fillers for gums or rubbers and for plastics or resins. The heat resistance of these products is not particularly good.

From the above it can be seen that general utilization of lignin on an industrial scale has been solved only in regard to burning or energy generating. In this way the only price benefits obtained from the wood lignin are those corresponding to the price charged for the fuel, less the costs of vaporizing the spent liquor. The entire world demand for vanillin and its derivates is satisfied by refining the spent liquor from a few sulfite factories. Other known ways in using lignin are generally of the nature of an auxiliary agent. In those cases the price is low and the consumption restricted. When using lignin as additives for polymers and plastics, great thermal or chemical resistance has not been even aimed at.

The utilization of lignin according to this invention can be considered to fall into the category item 5 above. This invention relates to a chemically resistant, thermostable or very thermostable in regard to heat resistance, mechanically strong, and electrically insulating polymer, and to its production by means of reactions of lignins in basic, neutral or acid conditions at a high temperature.

Even though the structure of lignin is not regular, its main basic unit is a phenyl propane body (I). The aromatic ring of this unit can have from 1 to 4, usually 2 or 3 unsubstituted hydrogen atoms.

A thioether bond between the phenyl propane units of lignin is in principle formed in the following way. One or several hydrogen atoms of the aromatic ring, usually in the 2, 5 and 6 positions of the ring, are split off so that hydrogen sulfide and one or several thioether bonds, depending on the conditions, are formed (compare 16).

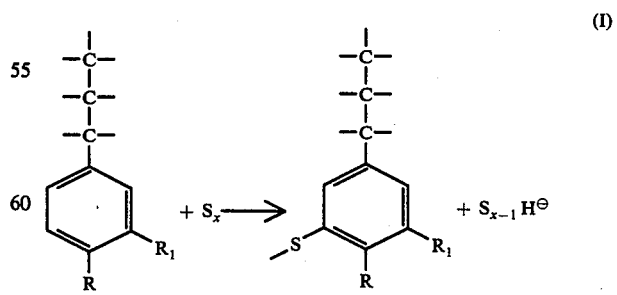

(I)

Also the side chain may react with sulfur or split off completely or partially in the same way as the substituents in it and the substituents R and $R_1$ of the ring. Of the latter two, usually R = —OH and $R_1$ = —$OCH_3$. Lignin of deciduous trees usually has two —OCH₃ groups in the 3 and 5 positions.

If one sulfur atom is linked into this kind of phenyl propane unit having a "molecular weight" varying between 165 and 250, this unit will contain about 19 to 12 % sulfur. Depending on the reaction conditions and on the quality of the desired product, even three atoms of sulfur can be linked per one aromatic ring so that the upper limit of sulfur content goes up to 37 %. If some of the substituents of the ring are also substituted by sulfur, the percentage of S can be even higher. The thermoplasticity of the material decreases as the reaction temperature and the percentage of sulfur increase, With high sulfur contents the material most probably is not at all thermoplastic as new bonds are formed between rings or side chains.

Release of hydrogen sulfide has been observed when analyzing gaseous reaction products, and its quantity is related to the quantity of linked sulfur. Release of hydrogen sulfide is typical in the formation of thioether bonds, and formation of thioether bonds has also been observed by means of IR spectra in the range from about 600 to 700 cm$^{-1}$ (FIGS. 1-4). Besides formation of thioether bonds, degradation of lignin apparently also takes place as the yield of polymer varies from about 15 % to about 90 %, calculated from the lignin used as starting material. The fact that IR spectra also become more gradually sloping than the spectrum of the starting material, is also a proof of polymerization taking place. Besides degradation, carbon-carbon bonds may also be formed in new positions. In connection with the reaction, chlorine is split off from chlorinated lignin, and this can be observed according to Example 3. Also lignosulfonic acid groups are partially split off during the reaction.

For steric reasons, thioether bonds cannot be formed in all aromatic rings, and the number of thioether bonds apparently varies in different rings. If a thioether bond cannot be formed, the hydrogen atom of the ring apparently is replaced by an —SH group which in further refining may further react as an end group.

The bonds between the aromatic rings in the product are theoretically as shown by (II) below, even though it has not been possible to identify them in detail:

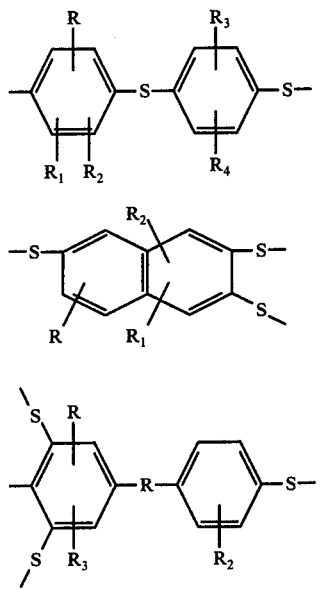

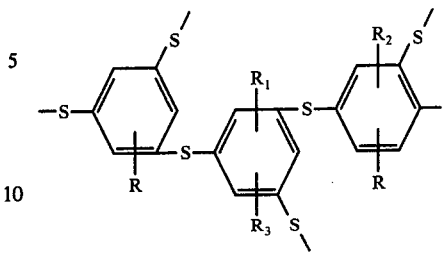

R-R₄ = substituents characteristic to the aromatic ring of lignin.

The structure of the formed polymer is thus a three-dimensional net. Heat resistance measured by the above TGA method is from 250° C to 500° C (Table I and Examples 6–8 and 11).

It has been noted that if special reaction retarders, controllers or solvents are not used in the production of the polymer, the polymer remains thermoplastic in the temperature range from about 160° C to about 265° C when using precipitated lignosulfonic acid. The above temperature limits are not exact and they may vary when using different reaction times, different lignins as starting materials, and different reaction controlling agents or solvents. when solvent has been added to the reaction mixture, a higher reaction temperature or a longer reaction time or both are especially necessary while the amounts of starting materials taking part in the reaction remain the same.

The thermoplasticity of the polymer is tested by applying to a sample a pressure of 200 kg/cm² at 300° C. The sample is to be regarded as having poor thermoplasticity when, in applying pressure, a piece is obtained which remains coherent but does not come up to the normal requirements set for plastic material.

The polymer is very inert chemically, as can be seen, for instance, from the fact that it is difficult to determine sulfur quantitatively by, chemical procedures, as by burning in oxygen, as the sample does not break down completely. The determination has to be carried out by physical methods, such as X-ray fluorecence or diffraction methods. The polymer is insoluble in water and in the usual solvents, so viscosity determinations cannot be carried out. The polymer is amorphous.

Production on a commercial scale of corresponding polymers, poly (phenylene sulfides), has recently been started in the U.S.A. under the name "Ryton PPS" ® from chlorinated monomeric compounds or compounds containing 1-3 aromatic rings, and alkali sulfides (10), but not from lignin or its degradation products. The high quality of poly (phenylene sulfide) products with respect to heat resistance, for instance, is indicated by the fact that they are used in combustion nozzles of space rockets. However, monomeric, chlorinated aromatic compounds are very expensive as starting materials when compared with lignin.

When carrying out this invention, it is possible to use spent liquors from pulp mills for instance, as well as spent liquors from different stages of pulp bleaching and containing chlorinated compounds. At present spent liquors from pulp bleaching are discharged into water courses. If products of very high quality are not sought at, untreated spent liquors can be used, or they can be concentrated by vaporizing, without removing carbohydrates from them. It is more advantageous, however, first to remove carbohydrates by known means or to isolate the lignin in the solution. This applied to both spent liquors from sulfite, sulfate and other pulp manufacturing processes, and spent liquors from pulp bleaching. Lignosulfonic acid or other lignin products thus obtained are even more suitable raw materials for the production of poly (phenylene sulfide) polymers and plastics than all the cmponents of spent liquor together.

Lignosulfonic acid can be isolated from spent liquors by known procedures by precipitation with amines or inorganic compounds, or after manufacturing alcohol or proteins from carbohydrates. Besides sodium and ammonium salts of lignin or lignosulfonic acid, their calcium, copper and zinc salts are also suitable starting materials in the method of this invention.

Calcium and magnesium lignosulfonates, for instance, can be freed from their salts, when desired, by passing them through a cation exchanger in $H^+$ form, and be changed into Na or $NH_4$ salts.

Calcium can also be partially or completely removed as slightly soluble calcium salts from lignosulfonate solutions. Suitable slightly soluble salts are, for instance, calcium sulfate, calcium carbonate or calcium oxalate. By using the corresponding acid as a precipitating agent, free lignosulfonic acid is obtained. A considerable part of the magnesium is precipitated as hydroxide by adding sodium hydroxide or ammonium hydroxide to a magnesium lignosulfonate solution.

Sulfate lignin, soda lignin or corresponding kinds of lignin can be isolated from their spent liquors by known procedures for instance, by precipitating them with acids. Different acids from sulfuric acid to carbonic acid can be used. Lignin of this kind from spent liquors can also be isolated from its solutions by precipitating as salts of different metals so that carbohydrate components substantially remain in the solution.

Also other cations besides sodium and ammonium can be first left in the lignin so that they are removed only after heating by acidifying or as sulfides from the reaction mixture. They can also be partially left in the polymer formed if they are not detrimental to the quality of the polymer or the plastic to be manufactured from the polymer.

It is characteristic of the process of this invention that lignin reacts with elementary sulfur, or with sulfur compounds, or with elementary sulfur or its ions and/or radicals formed from sulfur compounds during the reaction, so that a thermostable polymer with high sulfur content is formed. This has not previously been known.

The lignin polymer, formed in small quantities, for instance, in sulfate cooking and which is insoluble in water, contains only 1–3% sulfur. The sulfur content of a lignosulfonic acid polymer of very great molecular size is not more than about 7% (15). When lignosulfonic acid is broken down at high temperatures (250°–300° C) by means of alkali, such as NaHS, most sulfonic acid groups are split off from lignosulfonic acid and its degradation products.

Before starting the research work leading into this invention, the polymer mentioned in Example 4, separated on suction screens, was considered to be charred lignin containing some ash and other impurities. Only the analyses carried out in connection with this research work disclosed that this substance contained about 26 – 30% sulfur and this partly indicated the direction to the development work. This kind of polymer has not been found elsewhere than in connection with the cooking process of Rauma-Repola Oy; nor has any information about it been set forth in the literature.

When desired, lignin can be broken down into phenols of small molecular size by known procedures (8) such as alkali heating. These products can be added, together with lignin, to the reaction mixture in order to modify the properties of the polymer. The object of the patent Enkvist (8) is to break down lignin into compounds of small molecular size, and the reaction conditions have been chosen so that repolymerization is prevented, as this reduces the yield.

Compounds having groups with inductive effect such as hydroxyl, methoxy and thioether groups as activating substituents, can be used as degradation products of lignin or as corresponding synthetic compounds to be added to the reaction mixture together with lignin. It has been noted (12) that the reacting capacity of aromatic monomers with sulfur compounds depends on their activating effect. Thus thioether bonds are formed as easily between suitably substituted mono chlorinated compounds as between dichlorinated compounds mentioned in some patents (10). Lignin, on the other hand, forms thioether and carbon-carbon bonds even unchlorinated. This was not previously known.

If the temperature is low, the lignin preparation is demethoxylated only to a slight extent. When using temperatures from 160° C to 260° C, for instance, and reaction times of suitable length, a thermoplastic polymer which is thermostable is obtained. When the reaction temperature is raised, the thermostability of the polymer improves, but its machinability decreases. In order to improve machinability, other thermoplastic, heat resistant polymers and/or auxiliary agents can be added to the polymer.

It is thus possible to make polymers for infinitely varying requirements adjusting reaction conditions according to the properties desired.

Poly (phenylene sulfide) polymers and plastics made of synthetic compounds have been used for instance for handling corrosive liquids and gases in chemical industry in different devices and apparatuses such as compressors, pumps, pistons and bearings thereof, pipes, and containers, where stainless or acid proof steel, for instance, can be replaced by a polymer. They have also been approved for apparatus in the food industry in the U.S.A, as they have been found to be non-poisonous. Poly (phenylene sulfide) polymers are also used in electrical devices and in the electronic industry because of their good heat resistance and electrical properties. One of the most demanding uses is parts of space rockets, such as combustion nozzles of reaction motors.

Theoretically, corresponding polymers and plastics made of lignin should also be suitable for these purposes and their price should be generally lower.

The thermostability of some products according to this invention measured as weight loss at different temperatures by means of the TGA method, is set forth in Table I and Examples 6–8 and 11. Nitrogen was used as the inert gas and the heating time was ½ hour. Some TGA curves are set forth in FIG. 5.

The invention can, for instance, be put into practice in the following way: Lignin preparation and water or organic solvent and required amounts of alkali, sulfur and/or sulfur compound are mixed thoroughly. When only the sulfur of the sulfur compound used and the elementary sulfur are taken into account, the weight ratio of the total quantity to lignin preparation may vary from 2:1 to 1:20, i.e., from 200% to 5%, respectively, of sulfur with respect to lignin. The mixture is heated in an autoclave or an unpressurized vessel preferably in an inert gas such as nitrogen, at a temperature of 160°–350° C for up to 20 hours.

Some inorganic sulfur compound such as $H_2S$ $(NH_4)_2S$, alkali sulfide or alkaline earth metal sulfide or mixtures thereof can be used as the sulfur compound to be added to the lignin. Suitable organic sulfur compounds that can be used are, for instance, aliphatic or aromatic mercaptans, sulfides or disulfides and/or mixtures thereof. These can be either synthetic or obtained from degradation of lignin and containing preferably not more than three aromatic rings or a corresponding number of carbon atoms in an aliphatic compound. Also 2 thioepoxide or thioketone can be used as the organic sulfur compound to be added to the mixture.

A suitable total quantity of sulfur to be added to the lignin preparation is 5–50% of the dry weight of the lignin preparation, when a solvent or special reaction controlling agents are not used. When heating the mixture, a suitable temperature range is in this case about 160°–265° C. It has further been observed that under suitable conditions even a very short time, one minute or even less, is sufficient. A suitable reaction time for a mixture not containing solvent is from about 1 minute to about 10 hours.

Besides starting the heating of the mixture in a nitrogen and/or water vapor atmosphere, the mixture can also be heated in a hydrogen sulfide atmosphere and/or in a gas mixture of vapors of the solvent and reagents used.

Some organic solvent, either non-polar or polar, can be added to the reaction mixture before the reaction. Aromatic hydrocarbons such as xylene and cymene are examples of non-polar solvents. Suitable polar solvents are those containing nitrogen and/or sulfur, such as dimethyl formamide, dimethyl acetamide, sulfolane, N-methyl pyrrolidone, pyrrolidone, dimethyl sulfoxide, tetramethyl urea, etc.

The exothermic phase sometimes occurring at the beginning of the reaction can be restrained by cooling the reaction vessel from outside. The temperature can also be controlled by circulating the solvent in the reaction mixture or passing the reaction mixture, while in suspension or solution form, through heat exchangers. In this connection it is also possible to remove or add components to the mixture if desired. Similarly, the mixture can be heated at a later stage, if necessary.

When heating the mixture, gaseous products formed can be partially or completely released or they can be circulated through the reaction mixture.

When the reaction is finished, possible excess pressure is released and gaseous products are recovered before emptying the vessel or the autoclave.

It is possible to add alkali sulfides or hydroxides or carbonates, or corresponding alkaline earth metal or ammonium compounds or mixtures thereof.

Use of ammonia as a base is advantageous also in regard to the fact that it may form reaction accelerators or controllers when reacting with the degradation products of lignin. Surplus ammonia can easily be recovered from the gasing of pressure treatment, and ammonium salts are also easily sublimable. One object of using a base is to bind the acid compounds such as $H_2SO_3$ and HCl formed in the reaction, and to prevent the mixture from becoming too acid and corrosive.

The polymer formed in the reaction is separated from the reaction mixture by filtering, for instance, when necessary.

Unreacted sulfur and/or sulfur compounds and other detrimental compounds can be removed from the product, for instance, by acidifying or by washing with an organic solvent and/or water.

The reaction product is preferably extracted with water or other polar solvent for 1–2 hours in order to remove inorganic salts, after which the product is filtered and dried. The dried product is extracted with boiling toluene or similar solvent in order to remove associated sulfur and products of small molecular size. The remaining polymer is recovered and the solvent is evaporated.

If the heating stage is carried out under normal pressure, the composition of the mixture differs from the one used in pressure treatment mainly in that little or no water is added. More alkali, elementary sulfur or sulfur compounds can be used than in pressure treatment as they make the mixture softer and easier to stir. Besides stirring, the mixture can also be agitated by steam. This may also affect the chemical properties of the polymer. Gases escaping from the mixture have to be isolated because of their bad smell and their flammability.

After water addition, the reacted mixture can be treated as described above. The products of small molecular size which have been formed can be isolated from the heating mixture when desired, and inorganic salts remaining in the water solution are recovered and regenerated. If lignosulfonic acid is used, part of the sulfonic acid groups disappear in the reaction. The formation of the thioether groups mentioned above has been observed by IR spectroscopy. All lignin preparations form an amorphous polymer insoluble in water. Sulfur bonds partially containing oxygen may also be formed in the reaction (13). As is known, these bonds are chemically very stable (4, 12).

The thermostability of the polymer may increase when it is pressed, molded or otherwise further refined at temperatures higher than the reaction temperature and under high pressures: but in principle it remains thermoplastic, that is, it can be remolded.

The reaction can also be carried out so that the heat treatment is partly unfinished and is completed in a subsequent treatment of the polymer, such as pressing, molding, injection or heat treatment, taking place after the unfinished reaction.

When using a further treatment, sulfur or sulfur compounds may also be added to the polymer.

Before heating, heat resistant fillers, such as graphite, asbestos, etc. may be added to the reaction mixture and in this way the filler is very durably coated with the polymer. It is also possible to oxidize the sulfur bonds of the reaction product by known methods at a suitable stage so that poly (phenylene sulfide) groups are converted into sulfoxide and/or sulfonic groups (13). By means of oxidation the properties of the produced polymer can be modified.

The properties of the polymer made of lignin can also be modified by adding compounds of small molecular size containing one or several aromatic rings and having one or several halogen atoms as substituents in an aromatic ring, or corresponding compounds without halogen substituents, to the reaction mixture together with the degradation products of lignin mentioned above, or separately.

It is also possible to control the reaction and to modify the properties of the polymer by adding known compounds from the vulcanizing art, such as guanidine derivatives dithiocarbamine derivates or mercaptobenzodiazols, to the reaction mixture. These or similar compounds may be formed when the degradation products of lignin are reacted with ammonium ions and sulfur. Zinc and copper compounds have controlling properties of the same nature. The polymers as such, obtained from the reaction can be used for producing plastic articles, coatings, fillers, etc., or the polymer can be blended with one or several other polymers, plastics, gums or rubbers, elastomers, glues, softeners or other fillers. Heat resistant fibers, tissues or powders of glass, asbestos, graphite and polymer made according to the method of this invention can be used as filler. Due to its good adhering properties, the polymer produced can be used for coating of other materials more susceptible to corrosion.

The invention is further illustrated by the examples below. The first example is a comparison where no separate sulfur or sulfur compound has been added to the mixture, but the mixture contains sulfur compounds of the spent liquor as impurities.

EXAMPLE 1

50 ml of spent liquor solution was diluted with 100 ml of water, and 30 ml of 5M NH$_4$OH was added. The solution thus obtained was filtered. Ammoniumlignosulfonate (RLSNH$_4$) (containing 10.1% sulfur, weight loss 10% at 260° C) was precipitated from the filtrate by means of ethanol. 1.60 g of RLSHN$_4$ was placed into a closed ampulla under nitrogen atmosphere. The ampulla was placed in a moving furnace and heated at 275° C for 18 hours.

The reaction mixture was extracted with 100 ml of water for about 2 hours at room temperature, stirring it at the same time. The dried reaction product (0.66 g) was extracted with boiling toluene. Only 2% of the product was dissolved in toluene. The product insoluble in toluene (RLS) contained 9.9% sulfur, and the weight loss was 10% at 390° C and 95% at 500° C measured by TGA apparatus during half an hour. The results are set forth in Tables 1, 2 and 3.

EXAMPLE 2

Ammoniumlignosulfonate (RLSNH$_4$) was isolated as in Example 1. 1.60 g of RLSHN$_4$ and 0.56 g of sulfur was throughly mixed, placed into a closed ampulla under nitrogen, and heated at 265° C for 18 hours. The reaction product was treated as in Example 1. About 2% of the product was dissolved in boiling toluene. The part insoluble in toluene (0.75 g) contained 24.3% sulfur, and the weight loss was 10% at 410° C and 88% at 500° C measured as in Example 1. The results are in Tables 1, 2 and 3.

EXAMPLE 3

6 g of RLSHN$_4$ was dissolved in 100 ml of water, the solution was stirred at 60° C and 15 g of Cl$_2$ was passed into it during four hours (14). The reaction mixture was made basic by (NH$_4$)$_2$CO$_3$ and filtered. The chlorinated product (RLSCl) was precipitated from the filtrate with ethanol. The yield was 3 g, that is 50% of RLSHN$_4$·RLSCl contained 6.6 % sulfur and 9.6% Cl. Weight loss was 10% at 210° C. The quantity of chlorine in RLSCl can by varied by varying the quantity of chlorine introduced and the reaction temperature.

1.60 g of RLSCl and 0.56 g of sulfur was throughly mixed and placed into a closed ampulla under nitrogen atmosphere, as heated at 265° C for 18 hours. The reaction product was treated similarly to the reaction product in Example 1. The quantity of freed chlorine ions was determined argentometrically, and it was 9.3 % of RLSCl, that is nearly the same quantity as in RLSCl in the beginning of the reaction. The quantity of raw reaction product was 0.86 g, of which 18 % was dissolved in boiling toluene. The part insoluble in toluene (RLSS II) contained 31.3 % sulfur and 0.00 % chlorine. The weight loss was 10 % at 360° C and 61% at 500° C measured as in Example 1.

EXAMPLE 4

Polymer formed as a side product of the Na-sulfite process of Rauma-Repola Oy and stuck to the suction screen of a pulp digester was isolated. The product had been formed at a temperature of only about 160° C, under uncontrolled conditions, and it contained a relatively great amount of ash. However, it was so hard that it had to be loosened by a hammer. Heat resistance was not particularly good (Table 1), apparently because of the low reaction temperature and foreign components. According to IR spectra, the structure of the polymer corresponded to the structure of poly (phenylene sulfide). The analysis values of different samples were:

|              | Sample 1 | Sample 2 | Sample 3 |
|--------------|----------|----------|----------|
| C %          | 24.8     | 27.7     | 23.1     |
| H %          | 2.9      | 4.5      | 2.8      |
| N %          | —        | —        | —        |
| S %          | 30.3     | 27.1     | 25.9     |
| Ash (650° C) % | 5.0    | 3.7      | 5.2      |

Table 1

The weight losses of the starting materials and the products in the thermostability test calculated as percents of initial weight

|       | Starting materials | | Products | | | |
|-------|---------|--------|-------|---------|----------|------|
| ° C   | RLSNH$_4$% | RLSCl % | RLS % | RLSS I % | RLSS II % | RR % |
| 100   | 0.0     | 0.0    | 0.0   | 0.0     | 0.0      | —    |
| 150   | 1.5     | 3.9    | 1.1   | 0.5     | 0.9      | 3.9  |
| 200   | 2.4     | 8.7    | 1.1   | 1.0     | 1.6      | 5.9  |
| 250   | 7.5     | 19.1   | 1.1   | 1.3     | 2.9      | 11.8 |
| 300   | 17.2    | 34.7   | 1.1   | 1.4     | 5.2      | 16.2 |
| 350   | 36.3    | 47.8   | 1.9   | 2.2     | 9.4      | 24.3 |
| 400   | 42.4    | 62.3   | 14.3  | 7.8     | 16.7     | 34.3 |
| 450   | 51.2    | 75.0   | 43.1  | 26.6    | 32.0     | 53.4 |

Table 1-continued

The weight losses of the starting materials and the products in the thermostability test calculated as percents of initial weight

| °C | Starting materials | | Products | | | |
|---|---|---|---|---|---|---|
| | RLSNH$_4$% | RLSCl % | RLS % | RLSS I % | RLSS II % | RR % |
| 500 | 54.7 | 80.2 | 95.0 | 88.0 | 61.0 | 89.6 |

RLSNH$_4$ = ammonium lignosulfonate
RLSCl = chlorinated ammonium lignosulfonate
RLS = product (RLSNH$_4$, heated at 275° C in nitrogen)
RLSS I = product (RLSNH$_4$ + S, heated at 265° C in nitrogen)
RLSS II = product (RLSCl + S, heated at 265° C in nitrogen
RR = "digester stone"
[a)] Substance, the structure of which is nearly the same as in other poly (phenylene sulfides), according to IR-spectra and element analyses, has occassionally been formed in very small quantities in a pulp digester as a side product of the sulfite-soda process of Rauma-Repola Oy

Table 2

The starting materials, reaction conditions, and quantities of products in the tests

| | Starting materials | | | Conditions | | Quantity of Product g | | Quantity of end product as percents of starting material |
|---|---|---|---|---|---|---|---|---|
| | RLSNH$_4$ g | RLSCl g | S g | Reaction time (hours) | Reaction temperature (° C) | Insoluble into water | Insoluble into toluene | |
| Example 1 | 1.60 | | | 18 | 275 | 0.66 | 0.643 | 40 (RLS) |
| Example 2 | 1.60 | | 0.56 | 18 | 265 | 0.74 | 0.725 | 45 (RLSS I) |
| Example 3 | | 1.60 | 0.56 | 18 | 265 | 0.87 | 0.720 | 45 (RLSS II) |

RLSNH$_4$ = ammonium lignosulfonate, precipitated from spend liquor with (NH$_4$)$_2$CO$_3$ and ethanol
RLSCl = chlorinated ammonium lignosulfonate, precipitated with (NH$_4$)$_2$CO$_3$ and ethanol

Table 3

Quantity of sulfur and chlorine in starting materials and products

| Starting material or product | % S | % Cl |
|---|---|---|
| RLSNH$_4$ | 10.1 | not determined |
| RLSCl | 6.6 | 9.6 |
| RLS | 9.9 | not determined |
| RLSS I | 24.3 | not determined |
| RLSS II | 31.3 | 0.00 |

EXAMPLE 5

10 g of technical sulfate lignin was heated in an unpressurized vessel, through which nitrogen was passed, for 10 hours at 265° C in a reaction mixture containing 10 g of Na$_2$S·9H$_2$O and 10 g NaOH. The yield of purified polymer was 25% of the quantity of the starting material, and the sulfur content of the polymer was 18.7 %.

EXAMPLE 6

A reaction (No. 119) was carried out in an autoclave with technical NH$_4$ -lignosulfonate having a moisture content of 10%. The quantity of the starting material was 40 g. 80 g of elementary sulfur was added, the temperature was 265° C, the reaction time 2.5 hours, and the protective gas in the autoclave was N$_2$. The yield of purified polymer was 71.2% of the quantity of the starting material, sulfur content was 39%, and thermostability was 480° C.

EXAMPLE 7

A series was carried out with the above lignosulfonate in an autoclave so that the quantity of sulfur in the reaction mixture was changed while other conditions remained the same. The temperature was 265° C, the heating time 10 hours, and the quantity of starting material lignin was 40 g. The results are in Table 4.

Table 4

| Reaction No | Addition of Elementary S g | Yield in % of starting material | S % of dry material | Thermostability ° C |
|---|---|---|---|---|
| 111 | 80 | 51.5 | 34.6 | 470 |
| 124 | 40 | 57.4 | 30.3 | not determined |
| 125 | 20 | 53.4 | 29.7 | 500 |

EXAMPLE 8

A reaction (No. 126) was carried out in an autoclave with technical sulfate lignin with a moisture content of 8%. The reaction conditions were: temperature 265° C, addition of elementary S 80 g, reaction time 2.5 hours, and the quantity of starting material 40 g. The yield of purified polymer was 66.9% of the quantity of dry starting material, sulfur content was 27.9%, and the thermostability was 500° C.

EXAMPLE 9

The reactions set forth in Table 5 was carried out in an autoclave in nitrogen atmosphere by changing starting materials and reaction conditions. The quantity of starting material (dry weight) was 40 g.

Table 5

| Reaction No | Starting material | Reaction conditions | | Elem. S added g | Yield (% of starting material) | S content of polymer (%) | Thermoplasticity[1)] |
|---|---|---|---|---|---|---|---|
| | | Temperature (° C) | Time (hours) | | | | |
| 131 | Na—lignosulfon. | 265 | 10 | 40 | 29.9 | 20.1 | — |
| 136 | C—lignosulfon. | 265 | 10 | 40 | 78.3 | not determined | — |
| 160 | Zn—lignosulfon. | 240 | 2 | 20 | 69.0 | | + |

Table 5-continued

| Reaction No | Starting material | Reaction conditions Temperature (° C) | Time (hours) | Elem. S added g | Yield (% of starting material) | S content of polymer (%) | Thermoplasticity[1] |
|---|---|---|---|---|---|---|---|
| 163 | NH$_4$—lignosulfon. | 240 | 0.1 | 20 | 61.0 | | +[2] |
| 171 | NH$_4$—lignosulfon. | 220 | 2 | 20 | 24.0 | | +[3] |
| 159 | Dry substance of spent sulfite liquor | 240 | 1 | 20 | 40.3 | | — |
| 164 | Hydrolysis lignin | 235 | 1 | 20 | 86.5 | 25.2 | —[4] |

[1]Thermoplasticity was tested by pressing the sample by a pressure of 200 kg/cm$^2$ at 300° C. The sample is thermoplastic = +, the sample not at all or poorly thermoplastic = —.
[2]100 ml of xylene added to mixture before reaction.
[3]80 g of dimethyl formamide added to mixture before reaction.
[4]4 ml of 30 % NH$_4$OH added to mixture before reaction.

EXAMPLE 10

The reactions set forth in Table 6 were carried out in an autoclave in nitrogen atmosphere. Alkali or water was added to the mixtures together with elementary sulfur. The amount of starting material (calculated as dry material) was always 40 g.

Table 6

| Reaction No. | Starting material | Additions Elem. S g | NaOH g | H$_2$O g | Reaction time hours | Reaction temperature ° C | Yield in % of starting material | S % of polymer |
|---|---|---|---|---|---|---|---|---|
| 116 | Sulf.lignin | 60 | 20 | — | 10 | 265 | 65.4 | 19.7 |
| 123 | NH$_4$—lignosulf. | 80 | — | 80 | 10 | 265 | 45.3 | |
| 166 | NH$_4$—lignosulf. | 20 | — | 40 | 5 | 220 | 51.5 | not determined |

EXAMPLE 11

Some reactions carried out at low temperature or with short heating time and the properties of the polymers obtained are set forth in the following Table 7. 40 g of the same technical lignosulfonate as in the above examples was used as starting material.

Table 7

| Reduction No. | Reaction conditions Elem. S added g | Temperature ° C | Time | Yield in % of starting material | S % of polymer | Thermostability ° C | Thermoplasticity |
|---|---|---|---|---|---|---|---|
| 162 | 8 | 190 | 1 min. | 46.4 | 7.9 | 280 | + |
| 137 | 20 | 200 | 5 hours | 61.0 | not determined | 320 | + |
| 144 | 20 | 240 | 4 min. | 62.5 | | 320 | + |
| 146 | 20 | 260 | 23 min. | 61.0 | 16.9 | not determined | + |

EXAMPLE 12

A series with the above NH$_4$-lignosulfonate (40 g) was carried out in an autoclave using small additions of elementary S while other reaction conditions were the following: temperature 240° C, heating time 2 hours. The properties of the polymer are in Table 8.

EXAMPLE 13

Figure 3:
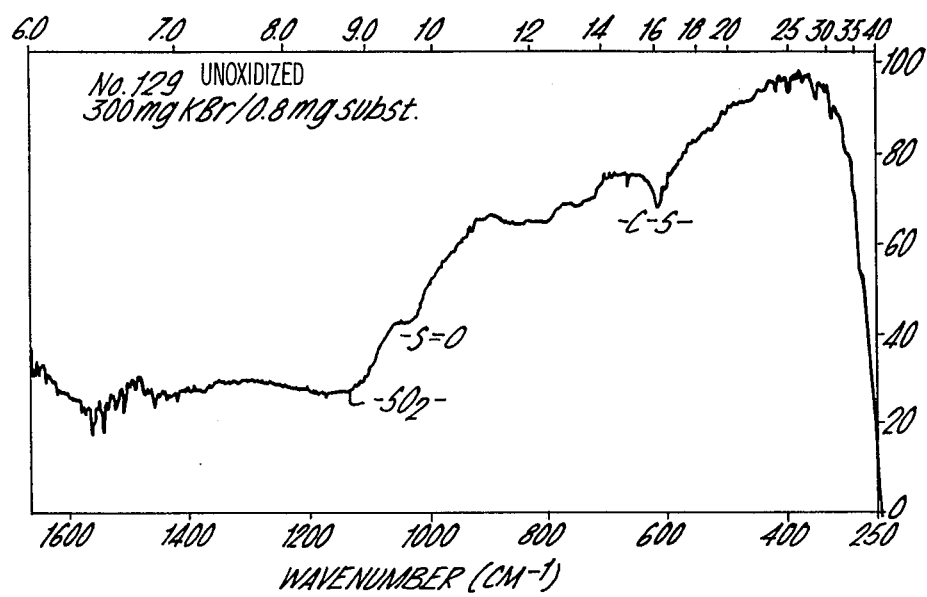
Figure 4:
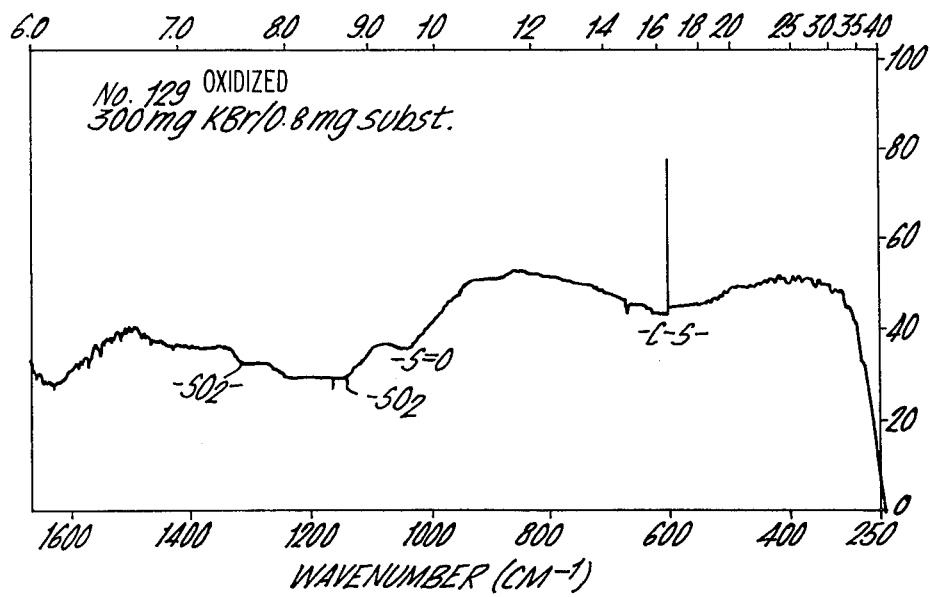

A reaction (No. 129) was carried out with the above NH$_4$-lignosulfonate (40 g) using 20 g of elementary sulfur, the temperature was 265° C, the heating time half an hour. The yield was 57.2 % of the dry starting material. The polymer contained 33 % sulfur. The thermostability was 500° C. The thioether bond of thus obtained polymer was oxidized by cooking the polymer in a water solution of hydrogen peroxide (5 - 30 %) for 5 - 30 minutes. The oxidizing of the thioether bond was observed by means of IR spectroscopy. The IR spectra of an unoxidized and an oxidized polymer are shown in FIGS. 3 and 4. The absorption of C-S bond decreases in the range of 600–700 cm$^{-1}$, while —S═O absorption in the range of 1050 - 1020 cm$^{-1}$ increases, and —SO$_2$ absorption appears in the range of 1350 - 1300 cm$^{-1}$ and is increasing in the absorption range of 1160 -1140 cm$^{-1}$.

EXAMPLE 14

0.38 g of thioglycolic acid lignin and 0.18 g of sulfur were mixed and placed into a closed glass ampulla in nitrogen atmosphere. The reaction mixture was reacted for 20 hours at 242° C.

The quantity of the product insoluble in water was 0.22 g and 0.21 g of this was product insoluble in toluene (I)·(I) was dissolved in DMSO at room temperature, the dissolved substance was precipitated with 0.5 M HCl and washed with water, the quantity of dark dry product (II) was 0.12 g. The product thus obtained contained 16.4 % sulfur and its thermal stability can be seen in Table 9. The quantity of the product insoluble in DMSO (III) was 0.07 g, and its thermal stability was poorer than that of (II) (compare Table 9).

Table 9

| Temperature °C | Remaining weight in % in different temperatures[1] | | |
|---|---|---|---|
| | Thioglycolic acid lignin | II | III |
| 200 | 96.8 | 98.7 | 96.3 |
| 250 | 90.3 | 97.4 | 94.0 |
| 300 | 67.6 | 94.4 | 90.1 |
| 350 | 58.6 | 90.3 | 80.1 |
| 400 | 49.6 | 81.5 | 67.2 |
| 450 | 37.5 | 62.8 | 37.3 |
| 500 | 16.7 | 18.2 | 5.7 |

[1] Thermal stability was determined in air, and the rate of raising the temperature was 10° C/min.

Literature

1. Pearl, I.A., The Chemistry of Lignin, 1967, New York, pp. 292–313.
2. Sarkanen, K.V. and Ludwig, C.H., Lignins, 1971, New York, pp. 797 – 859.
3. Vogel, H., Sulfitzellstoff-Ablaugen, 1948, Basel, pp. 201, 206 – 212.
   Friedman, L.J., Lewit, R.M., Meos, A.J., Khim. Volokna 1969, No. 6, pp. 38 – 40, Ref. ABIPC, 40 (1970) ref. 8817.
4. Lenz, R.W. and Handlowitz, C.E., J. Polym. Sci, 43 (1960), p. 167.
5. Bayer Aktiengesellschaft, Bundesrepublik Deutschland, Finnish Patent Application No. 1048/72.
6. Fukuoka, Y., Jap. Chem. Quart, 5 (1969) No. 5, pp. 63 – 66, Chem Abstr. 71 (1971) ref. 71769.
7. Enkvist, T.U.E., Finland, Finnish. Patent No. 37,402, Class 12 0 11.
8. Turunen, J., Soc. Scient. Fenn. Comment. Phys. Mathem. 28 (1963) No. 9, pp. 59 – 60.
9. Phillips Petroleum Company, USA, U.S. Pat. No. 3,354,129.
10. Enkvist, T., Turunen J. and Ashorn, T., Tappi 45 (1962) pp. 128 – 135.
11. Hortling, B. and Lindberg, J.J., Finska Kemistsamf. Meddel. 81 (1972) p. 2, IUPAC, International Symposium 1972, Helsinki No. 5, p. 37.,
    Chemica Scripta 2 (1972) p. 179.
12. Lindberg, J.J., Finska Kemistsamf. Meddel. 64 (1955) p. 26.
13. Nakajima, K., Masamichi, O. and Onoe., S., J. of the Japanese Techn. Assoc. of Pulp Paper Ind., 18, (1964) p. 228.
14. Turunen, J., Paperi ja Puu, 49 (1967): 4a, 151-158.
15. Mayer, R. Zeitschr. f. Chemie 13, (1973): 9, 321 – 28.

We claim:

1. A method for producing a three-dimensional aromatic nuclei-containing, sulfur-containing polymer derived from lignin and exhibiting a weight loss of less than 10% when heated to 200° C for ½ hour in an inert gas, said method comprising:
   heating, in a homogeneous reaction mixture, at least one lignin preparation which is a member of the group consisting of thioglycolic acid-lignin, sulfate-lignin, alkali-lignin, lignosulfonic acid, hydrolysis lignin, chlorinated lignin, ammonium-, alkali-, and alkaline-earth salts of said lignins and lignosulfonic acid, sulfite and sulfate pulp liquor from which carbohydrates have been removed, and lignin degradation products having a suitable activating substituent
   with
   at least one member of the group consisting of sulfur and a sulfur-containing compound from the group consisting of inorganic sulfides, mercaptans, thioepoxides, thioketones, organic sulfides, disulfides, and sulfur-containing lignin degradation products or mixtures thereof, the amount of elemental sulfur or the sulfur in said sulfur-containing compound comprising from 10–200% by weight of said lignin preparation, at a temperature of about 190°–350° C, for a time sufficient to form the polymer but not longer than 20 hours, wherein the hydrogen atoms of the aromatic rings of the phenyl propane units of lignin or of the conversion products of the phenyl propane units of lignin are partially or completely substituted by thioether bonds.

2. The method according to claim 1, wherein gaseous products formed in the reaction vessel are circulated through the reaction mixture.

3. The method according to claim 1 wherein the reaction mixture is heated for a time from about 1 min. to about 20 hours at a temperature of about 160°–350° C.

4. A method in accordance with claim 1 wherein the inorganic sulfide is a member of the group consisting of $H_2S$, $(NH_4)_2S$, an alkali metal sulfide, an alkaline earth metal sulfide, and mixtures thereof.

5. A method in accordance with claim 1 wherein the sulfur compound is organic and is an aliphatic or aromatic mercaptan, a sulfide, a disulfide, or mixtures thereof, said sulfur compound being synthetic or obtained by degradation of lignin, said sulfur compound further containing not more than three aromatic rings or a corresponding number of carbon atoms in an aliphatic compound.

6. The method according to claim 1 wherein there is added to the reaction mixture a member of the group consisting of alkali hydroxides, alkali carbonates, alkaline earth hydroxides, alkaline earth carbonates, ammonium hydroxide, ammonium carbonate, and mixtures thereof.

7. The method according to claim 1 wherein the reaction is carried out in the presence of an added solvent, the heating is carried out in a pressurized vessel and gaseous products formed in the reaction are partially or completely discharged from the vessel.

8. A method according to claim 1 wherein the reaction mixture is in the form of a melt, the heating is carried out in an unpressurized vessel under a protective gas, and the melt is substantially free of water.

9. The method according to claim 8 wherein the protective gas is a member of the group consisting of nitrogen and water vapor.

10. The method according to claim 1 wherein unreacted sulfur or sulfur compounds and other detrimental compounds are removed from the product by extracting with an organic solvent, water, or a mixture thereof.

11. The method according to claim 1 wherein the polymerization reaction is interrupted and the reaction mixture is retained for further processing of the polymer.

12. The method according to claim 1 wherein the products from the degradation of lignin or corresponding synthetic compounds having from one to three aromatic rings, and having groups with inductive effect selected from the group consisting of hydroxyl, methoxy, and thioether groups, as activating substituents, are added to the reaction mixture in addition to the lignin.

13. The method according to claim 5 wherein the solvent added to the reaction mixture prior to the reaction is an organic solvent and the heating is carried out in an atmosphere of the solvent vapor.

14. The method according to claim 13 wherein the solvent is a member of the group consisting of dimethyl formamide, dimethyl acetamide sulfolane, N-methyl pyrrolidone, xylene, and cymene.

15. The method according to claim 1 wherein there is added to the reaction mixture a member of the group consisting of guanidine derivatives, dithiocarbamine derivatives, mercaptobenzodiazoles, zinc salts, copper salts, and mixtures thereof.

16. The method according to claim 1 wherein the reaction temperature is controlled by cooling or heating of the reaction vessel.

17. The method according to claim 1 wherein the reaction temperature is controlled by circulating a solvent or reaction mixture through heat exchangers.

18. The method according to claim 1 wherein the reactants are added to the reaction mixture gradually or periodically while said reaction mixture is circulating to control the reaction.

19. The method according to claim 1 wherein the thioether groups of the polymer are partially or completely oxidized to sulfoxide or sulfone groups.

20. The method according to claim 1 wherein the reaction is carried out in the absence of added solvent.

21. The process of claim 20 wherein the amount of elemental sulfur or the sulfur in the sulfur-containing compound comprises from 10–50% by weight of the lignin preparation.

22. The process of claim 21 wherein the reaction is carried out at a temperature of about 190°–265° C.

23. The process of claim 22 wherein the duration of the reaction is from 1 to 10 hours.

* * * * *